US012773077B2

(12) United States Patent
Schnitzer et al.

(10) Patent No.: US 12,773,077 B2
(45) Date of Patent: Oct. 27, 2026

(54) CLEANING ROBOT HAVING A ROBOT ARM AND METHOD FOR CONTROLLING THE CLEANING ROBOT

(71) Applicant: BSH Hausgeräte GmbH, Munich (DE)

(72) Inventors: Frank Schnitzer, Bad Neustadt (DE); Kristina Daniel, Bad Neustadt (DE)

(73) Assignee: BSH Hausgeräte GmbH, Munich (DE)

( * ) Notice: Subject to any disclaimer, the term of this patent is extended or adjusted under 35 U.S.C. 154(b) by 94 days.

(21) Appl. No.: 18/817,523

(22) Filed: Aug. 28, 2024

(65) Prior Publication Data

US 2025/0072678 A1 Mar. 6, 2025

(30) Foreign Application Priority Data

Aug. 31, 2023 (DE) ..................... 10 2023 208 401.5

(51) Int. Cl.

| | |
|---|---|
| ***A47L 7/00*** | (2006.01) |
| ***A47L 9/00*** | (2006.01) |
| ***A47L 9/28*** | (2006.01) |
| ***A47L 11/40*** | (2006.01) |
| ***B25J 5/00*** | (2006.01) |
| ***B25J 11/00*** | (2006.01) |
| ***G05D 1/241*** | (2024.01) |
| ***G05D 1/622*** | (2024.01) |
| ***G05D 105/10*** | (2024.01) |

(52) U.S. Cl.

CPC ............... *A47L 7/009* (2013.01); *A47L 9/009* (2013.01); *A47L 9/2826* (2013.01); *A47L 9/2847* (2013.01); *A47L 9/2852* (2013.01); *A47L 11/4011* (2013.01); *A47L 11/4044* (2013.01); *A47L 11/4061* (2013.01); *B25J 5/007* (2013.01); *B25J 11/0085* (2013.01); *G05D 1/241* (2024.01); *G05D 1/622* (2024.01); *A47L 2201/04* (2013.01); *A47L 2201/06* (2013.01); *G05D 2105/10* (2024.01)

(58) Field of Classification Search

None

See application file for complete search history.

(56) References Cited

U.S. PATENT DOCUMENTS

2001/0004719 A1* 6/2001 Sommer ............ A47L 11/4044 15/319

FOREIGN PATENT DOCUMENTS

CN 108403013 A * 8/2018 ............. A47L 11/24
CN 113545707 A * 10/2021 ............. A47L 11/40

(Continued)

OTHER PUBLICATIONS

Machine translation: CN-114224226, Xie, N. (Year: 2022).*
Machine translation: CN-108403013, Xu, Y. (Year: 2018).*
Machine translation: CN-113545707; Hunag, C. (Year: 2021).*

*Primary Examiner* — Natasha N Campbell

(74) *Attorney, Agent, or Firm* — Laurence A. Greenberg; Werner H. Stemer; Ralph E. Locher

(57) ABSTRACT

A cleaning robot cleans a cleaning region and has a housing, a drive unit for driving the cleaning robot in the cleaning region, a floor cleaning unit for cleaning a floor surface of the cleaning region, and a robot arm for moving objects and/or for cleaning a surface that is raised with respect to the floor surface. The robot arm is arranged on a housing front of the housing in a resting position. The clean robot further has a control unit for controlling the drive unit, the floor cleaning unit and the robot arm. The robot arm forms a bumper in the resting position.

9 Claims, 4 Drawing Sheets

(56) References Cited

FOREIGN PATENT DOCUMENTS

| | | | | | |
|---|---|---|---|---|---|
| CN | 114224226 | A | * | 3/2022 | ............ B25J 9/1602 |
| CN | 219021001 | U | | 5/2023 | |
| DE | 102017112740 | A1 | | 12/2018 | |
| EP | 3679847 | A1 | | 7/2020 | |
| WO | 2021142984 | A1 | | 7/2021 | |

* cited by examiner

CLEANING ROBOT HAVING A ROBOT ARM AND METHOD FOR CONTROLLING THE CLEANING ROBOT

CROSS-REFERENCE TO RELATED APPLICATION

This application claims the priority, under 35 U.S.C. § 119, of German Patent Application DE 10 2023 208 401.5, filed Aug. 31, 2023; the prior application is herewith incorporated by reference in its entirety.

FIELD AND BACKGROUND OF THE INVENTION

The invention relates to a cleaning robot for cleaning a cleaning region. The cleaning robot has a housing, a drive unit for driving the cleaning robot in the cleaning region, a floor cleaning unit for cleaning a floor surface of the cleaning region, a robot arm for moving objects and/or for cleaning a surface that is raised with respect to the floor surface. The robot arm is arranged in a resting position on a housing front of the housing. A control unit is provided for controlling the drive unit, the floor cleaning unit and the robot arm. The invention further relates to a method for controlling the cleaning robot.

Self-propelled cleaning robots are known which are used for cleaning, in particular for vacuuming and/or mopping, a flat flooring. While current robot models can only clean the flat flooring to a greater or lesser extent, future cleaning robots should also be able to tidy up objects that are lying around. For this purpose, cleaning robots are known that are equipped with a manipulator, with the aid of which the cleaning robot can grip objects, among other things.

Internation patent disclosure WO 2021 142 984 A1 discloses a mobile robot that comprises a robot body and a robot arm. One end of the robot arm is connected to the robot body and the other end is configured as a clamping part, wherein the clamping part is used for gripping an object. The robot body is provided with a recess for receiving the robot arm, wherein the robot arm is arranged in a curved or folded manner in the recess.

SUMMARY OF THE INVENTION

The object of the invention is to provide a cleaning robot having a robot arm, which is characterized by a compact and cost-effective configuration.

The object is achieved by a cleaning robot as claimed in the independent cleaning robot claim and also a method as claimed in the independent method claim. Preferred or advantageous embodiments of the invention and other categories of the invention are evident in the further claims, the following description and the attached figures.

The subject matter of the invention is a cleaning robot, which is configured and/or suitable for cleaning a cleaning region. A cleaning robot is a cleaning appliance that is able to move automatically or autonomously in a cleaning region in order to completely or partially clean one or more surfaces to be cleaned in the cleaning region. In particular, a cleaning region is to be understood as a region that is delimited and/or closed off in a building, preferably one or more rooms that are connected to one another.

The cleaning robot has a housing, a drive unit, and a floor cleaning unit. The housing is to be understood in particular as the outer housing of the cleaning robot, which closes off the cleaning robot from the outside. The interior of the housing is therefore the interior of the cleaning robot. In other words, at least the drive unit and the floor cleaning unit are received or arranged in the housing.

The drive unit is used for driving the cleaning robot in the cleaning region. For this purpose, the drive unit can be configured as a wheel or caterpillar drive. The drive unit preferably has a chassis having at least or exactly one drive means, which is or can be driven preferably via an electric drive motor for moving the cleaning robot. In other words, the drive means acts directly on the substrate to be cleaned, preferably a floor surface, of the cleaning region in order to move the cleaning robot. In order to form the wheel drive, the drive means can be configured as a wheel, a roller or a ball. Alternatively, the drive means for forming the caterpillar drive can be formed as a chain or a belt. Optionally, in addition, one or more support wheels without drive can be provided.

The floor cleaning unit is used to clean the floor surface of the cleaning region. For this purpose, the floor cleaning unit can contain a vacuum cleaner, for example a wet vacuum cleaner and/or a dry vacuum cleaner. Alternatively or optionally in addition, the floor cleaning unit can comprise one or more fixed or driven brushes, rollers, wipers, cloths or the like. In particular, the housing has a suction duct and a suction mouth that adjoins the suction duct and faces the floor surface to be cleaned on an underside of the housing. The suction mouth is preferably connected to the floor cleaning unit, preferably the vacuum cleaner, in order to suck air through the suction channel and the suction mouth.

The cleaning robot has a robot arm, which is configured and/or suitable for moving objects and/or for cleaning a surface that is raised with respect to the floor surface, wherein the robot arm is arranged on a housing front of the housing in a resting position. In particular, a robot arm is to be understood as a single- or multi-joint manipulator, which has an end effector, preferably a gripper, at its free end. The robot arm is preferably arranged on the housing so as to be rotatable about a rotation axis via a base joint and so as to be tiltable about a tilt axis via a tilting joint. The axis of rotation and the tilting axis are preferably arranged at right angles to one another. Alternatively or optionally in addition, the axis of rotation is oriented in the same direction as a housing vertical axis and/or the tilt axis is oriented in the same direction as a housing longitudinal axis and/or a radial plane of the housing vertical axis, at least in a basic position. For example, in the resting position, the robot arm can be arranged stowed, preferably curved and/or folded, on the housing front. The robot arm can be transferred from the resting position into at least or exactly one operating position. In the operating position, the robot arm can manipulate, preferably grip and/or move, objects that are arranged in the cleaning region. Alternatively or optionally in addition, in the operating position, the robot arm can grip and/or use a tool for cleaning the raised surface, for example a piece of furniture.

In addition, the cleaning robot has a control unit, which is configured and/or suitable for controlling the drive unit, the floor cleaning unit and the robot arm. In particular, the control unit is configured so as to perform navigation and/or control of the cleaning robot in the cleaning region on the basis of environment and sensor data. The control unit can control the drive unit and the floor cleaning unit in order to guide the cleaning robot systematically over the floor surface and to clean the floor surface. The control unit can furthermore control the robot arm in order to manipulate objects that are arranged in the path of the robot, that is to say, for example, to tidy them up or at least move them aside in order to create space for floor cleaning, and/or to clean the raised surface, in particular by means of the tool. The control unit is preferably received or arranged in the housing and is connected in terms of signal technology to the drive unit, the floor cleaning unit and the robot arm.

Within the scope of the invention, it is proposed that, in the resting position, the robot arm forms a bumper. In particular, the bumper is used to absorb and/or detect a collision with an obstacle. In the simplest embodiment, the robot arm forms impact protection, which is configured as a mechanical buffer in order to absorb and/or damp a collision between the cleaning robot and the obstacle. In the resting position, the robot arm is preferably arranged on the housing in such a manner that it does not form an interference contour, in particular at the height of the cleaning robot. In the resting position, the robot arm preferably extends for the most part over the entire housing front. In this case, the housing front is to be understood as that part of the housing which, in principle, can come into contact with an obstacle when driving straight ahead. In other words, in the event of a collision with an obstacle, the cleaning robot comes into contact with the obstacle exclusively with the robot arm. For example, the housing front can have a round or angular outer contour, wherein, in the resting position, the robot arm at least approximately follows the outer contour of the housing front. In particular, in the resting position, the robot arm is mounted in such a manner that it can be moved relative to the housing.

The invention is based on the knowledge that, in the case of a combination of a moving platform and a robot arm, the space requirement of the cleaning robot—above all in terms of height—can increase quickly and thus redefine the overall height of the cleaning robot. In the operating position, the robot arm can protrude beyond the housing, as a result of which driving under furniture or objects, such as a bed, chairs, etc., is restricted and/or can lead to damage to the robot arm.

The advantage of the invention is that, in the resting position, the robot arm can be arranged on the housing in a space-saving manner. As a result, the mobility of the cleaning robot in the cleaning region is not restricted by the robot arm, so that the cleaning robot, in accordance with its housing dimensions, can travel under objects in the cleaning region without being hindered. A further advantage is that, in the resting position, the robot arm can be used as a bumper, as a result of which it is possible to omit the arrangement of an additional bumper on the housing front. A cleaning robot having a robot arm is thus proposed, which is characterized by a compact and cost-effective configuration.

In a specific embodiment, it is provided that the housing has a receiving region for the robot arm on the housing front. In particular, the receiving region is used to receive and/or support the robot arm in the resting position. In the resting position, the robot arm is arranged within a maximum height of the cleaning robot in the receiving region. In simple terms, with respect to a housing vertical axis, the robot arm is arranged without protrusion in relation to the highest point of the cleaning robot in the receiving region. The maximum height of the cleaning robot is preferably defined by the housing itself or by a structure that is arranged on the housing, such as, for example, an environment sensor. A cleaning robot is thus proposed, the maximum height of which in the resting position of the robot arm is determined by the housing or a structure and not by the robot arm.

Alternatively or optionally in addition, it is provided that the robot arm is arranged in the receiving region with a protrusion from the housing at least in relation to the housing vertical axis and/or a housing longitudinal axis. Optionally, in addition, with respect to a housing transverse axis, the robot arm is arranged in the receiving region with a protrusion in relation to the housing. In other words, the robot arm protrudes beyond the housing forwards, upwards and, optionally, at least in sections to the two sides. For example, the protrusion can be at least 1 mm, preferably more than 5 mm, in particular more than 10 mm. Specifically, the housing vertical axis, the housing longitudinal axis, and the housing transverse axis are defined by a reference coordinate system, wherein a z-axis is coaxial with the housing vertical axis, an x-axis is coaxial with the housing longitudinal axis, and a y-axis is coaxial with the housing transverse axis. In particular, a direction of travel of the cleaning robot during straight-ahead travel is oriented in the axial direction with respect to the housing longitudinal axis. The protrusion ensures that the robot arm first comes into contact with an obstacle, even before the housing itself collides with the obstacle.

In one development, it is provided that the receiving region has a bearing section, which is configured and/or suitable for bearing the robot arm on the housing. In particular, the bearing section is used for horizontally bearing or storing the robot arm in the resting position. For this purpose, the robot arm is supported on the bearing section at least in the axial direction in relation to the housing vertical axis. The bearing section can be configured as an edge which is oriented in the axial direction in relation to the housing longitudinal axis and/or in the axial direction in relation to the housing transverse axis and which extends at least on the housing underside on the housing front. In particular, the bearing section extends in a radial plane of the housing vertical axis.

In accordance with this development, the bearing section has at least or exactly one sliding surface, via which, in the resting position, the robot arm is supported, at least in sections, in a sliding manner on the bearing section. In particular, the sliding surface has the function of reducing friction between the robot arm and the bearing section when the robot arm is in the resting position. The sliding surface can be arranged in regions in a punctiform or full-area manner on the bearing section. For example, the sliding surface can be formed by one or more Teflon platelets. The bearing section can ensure that the robot arm is relieved of strain in the resting position, so that, in particular, the joint drives of the robot arm are relieved of strain. Owing to the sliding bearing arrangement, it is moreover also ensured that the robot arm can even be moved, due to the reduced frictional force, relative to the housing in the event of a small introduction of force in the event of a collision with an obstacle.

In a further specific embodiment, it is provided that the robot arm has at least or exactly two segments, which are connected to one another via a joint in each case to form a serial kinematic system. In particular, the manipulator is formed by at least one segment and the end effector is formed by at least one segment. The segments can be configured as hollow and/or have a sheathed support structure. The joints are preferably in the form of a pivoting joint. A first segment can be connected in an articulated manner to the housing on one side via the base joint and/or the tilting joint and can be connected in an articulated manner to a second segment on the other side via a first joint. The second segment can in turn be connected to a third segment, etc., via a second joint. In other words, the first segment is embodied as a base segment, the second segment is embodied as an intermediate segment, and the third segment is embodied as a further intermediate segment or the end effector. The robot arm, particularly preferably, has exactly five of these segments.

In accordance with this embodiment, it is provided that, in the resting position of the robot arm, at least one segment is arranged on a first side surface of the housing front, and the one segment or a further segment is arranged on a front surface of the housing wall, and the one segment or a further segment is arranged on a second side surface of the housing front. In the case of a round outer contour, the at least one segment, or the individual segments, at least approximately follows the outer contour of the housing in an angular range of more than 90° and/or at least or exactly 180°. In the case of an angular contour, the at least one segment or the individual segments at least approximately follow the outer contour of the housing in that the joints are arranged at the corners and/or the segments are arranged at an angle, preferably at right angles, to one another. Alternatively, or optionally in addition, the at least one segment or the individual segments have a similar contour and/or shape to the housing. This means that the segment or segments are angular or round in shape according to the outer contour of the housing. The segments are particularly, preferably arranged in the same direction and/or parallel and/or equidistant from the respective side surface or front surface. A robot arm is thus proposed, which in the resting position at least partially covers the housing front both in the longitudinal direction of the housing as well as in the transverse direction of the housing, in order to protect it in the event of a collision with an obstacle.

In a further embodiment, it is provided that the robot arm has a contact sensor system, which is configured and/or suitable for detecting a collision with an obstacle in the cleaning region. The contact sensor system can be formed by one or more individual sensors and/or sensor systems. The contact sensor system is particularly preferably embodied as a surface-covering contact sensor system, which is configured so as to detect contact between the robot arm and the obstacle at any point on the robot arm, preferably at least in the longitudinal direction of the housing and/or in the transverse direction of the housing.

The contact sensor system is configured so as to provide a sensor signal when the robot arm comes into contact with an obstacle in the resting position. The control unit is configured so as to influence a route plan of the cleaning robot on the basis of the sensor signal. In particular, the control unit is configured so as to determine a movement path of the cleaning robot over the floor surface on the basis of information from the contact sensor system, in particular the sensor signal, and to control the cleaning robot in accordance with the planned movement. For this purpose, the control unit can actuate the drive unit on the basis of the sensor signal in order to change a direction of travel of the cleaning robot. Optionally, in the operating position of the robot arm, the contact sensor system can be used to detect a collision between the robot arm, preferably the manipulator and/or the end effector, and the environment and/or with the object to be manipulated. A robot arm is thus proposed, which, in addition to functioning as a bumper, is also used so as to detect collisions during a movement of the cleaning robot in the cleaning region.

In a first embodiment, it is provided that the contact sensor system is formed by at least or exactly one surface sensor, which is arranged at least in sections on an outer side of the robot arm, in particular of the segments. In particular, the surface sensor is arranged over an area, preferably over the entire area, on the front side of the robot arm and/or on the sides of the robot arm. The surface sensor is preferably formed by a resistive and/or capacitive surface sensor. In other words, the surface sensor is configured so as to be contact-sensitive and/or pressure-sensitive and/or proximity-sensitive. The surface sensor is preferably configured so as to generate the sensor signal in the event of contact with the obstacle and/or an approach to the obstacle. For example, the surface sensor can be realized by a sensitive skin or coating that reacts to resistive or capacitive changes. A contact sensor system is thus proposed, which renders it possible to detect contact between the robot arm and an obstacle over a large area, preferably over the entire area.

In an alternative or optionally supplementary embodiment, it is provided that the contact sensor system is formed by at least or exactly one contact sensor, which is arranged in at least or exactly one segment and/or at least or exactly one joint of the robot arm. In particular, a contact sensor is arranged in each segment and/or in each joint, preferably including the base joint and/or the tilting joint. The at least one contact sensor can be configured as a force and/or torque sensor. The at least one contact sensor is preferably configured as a torque sensor that is arranged in the joint of the robot arm and/or as a force sensor that is arranged in the at least or exactly one segment. The at least one contact sensor is preferably configured so as to generate the sensor signal on the basis of an introduction of force in the event of a collision with the obstacle. A contact sensor system is thus proposed, which is characterized by a particularly robust configuration.

In one alternative or optional additional embodiment, it is provided that the contact sensor system is formed by at least or exactly one articulated drive of the robot arm, wherein the control unit is configured so as to monitor a motor current of the articulated drive. In particular, the robot arm has one joint drive per joint, all of which are and/or can be monitored by the control unit. The control unit preferably has a monitoring module that is configured so as to monitor the motor currents of the joint motors and so as to generate the sensor signal in the event of a current change. In addition, the control unit can have a calculation module that is configured so as to determine the location and/or the size of the collision based on the sensor signal and/or the current change. A collision detection system is thus proposed, which gets by without additional sensors, so that costs can be saved.

In a specific development, it is provided that all joints of the robot arm are arranged in the resting position in such a manner that, in the event of contact with an obstacle, for each direction of force, in particular in the longitudinal direction of the housing and in the transverse direction of the housing, an associated torque, which can be detected by the contact sensor system, results about at least one of the joints. In other words, there is at least or exactly one corresponding joint for each direction of force to be detected. In particular, the term “all joints” refers to the joints between the segments as well as the base joint. The joints preferably each define a pivot axis that, in the rest position, are oriented in the same direction as one another and/or parallel to the housing vertical axis and/or to the axis of rotation. In particular, the joints can be moved exclusively in a rotational manner, wherein for each joint, in the resting position, one or more segments form a lever arm around the corresponding joint. In other words, when force is introduced directly into a joint, a torque results in at least or exactly one adjacent joint. Each joint is particularly preferably located on at least one segment line of at least one segment or is arranged with a lever arm of significantly less than 90 degrees, preferably less than 70 degrees, to the associated segment. The calculation module of the control unit is optionally configured so as to determine the size and/or the location of the collision on the basis of the torque that is introduced. The calculation module is preferably configured so as to take into account an addition of torques at joints located one behind the other. In this case, the invention is based on the knowledge that, depending on the contact point of a contact or collision, torques are introduced at different joints, wherein, on the basis of the serial kinematic system of the robot arm, it is necessary to pay attention to the addition of the torques at joints located one behind the other, since a collision can have an influence on a plurality of joints and a collision force can be distributed to these. A contact sensor system is thus proposed, which is characterized by a particularly reliable and accurate detection of obstacles by the robot arm.

In a further realization, it is provided that the cleaning robot has an environment sensor, which is configured and/or suitable for capturing environmental data in relation to the cleaning region. In particular, the environment sensor is used for creating an environment map of the cleaning region and/or for navigating the cleaning robot in the cleaning region. The environment sensor is preferably configured as an optical sensor, for example a camera sensor, a lidar sensor or a laser sensor. The environment sensor is preferably arranged on an upper side of the housing. In the resting position of the robot arm, the environment sensor thus forms the highest point of the cleaning robot in relation to the housing vertical axis.

In the operating position, the robot arm is arranged at least in sections in a detection region of the environment sensor, wherein the part of the robot arm that is arranged in the detection region has a smaller cross section than a part of the robot arm that is arranged outside the detection region. In particular, the part of the robot arm that is arranged in the detection region has at most half the diameter and/or half the width and/or height as the part of the robot arm that is arranged outside the detection region. The robot arm is particularly preferably arranged and/or can be arranged exclusively with the cross-section-reduced part in the detection region of the environment sensor. For example, the cross-section-reduced part can be formed on the base segment in sections or can be formed by the base segment. A robot arm is thus proposed, which, in particular in the operating position, forms an interference contour that is as small as possible in the detection region of the environment sensor. In addition, the detection region is not restricted at any time in the resting position.

Optionally, the environment sensor can be protected by a protective cover, which is supported on the upper side of the housing via one or more support sections. In the operating position, the cross-section-reduced part of the robot arm is preferably arranged flush and/or in overlap with the at least one support section in the detection region. The support section results in a dead region, in particular a "dead" angle range, in the detection region of the environment sensor, in which no environment detection can be performed by the environment sensor. By covering the support section with the cross-section-reduced part of the robot arm in the operating position, it is possible to avoid an additional dead region in the upper operating position of the robot arm.

In a specific implementation, it is provided that at least the part of the robot arm that can be arranged in the detection region, in particular the base joint, is recessed in the housing in the resting position. Alternatively or optionally in addition, at least the part of the robot arm that can be arranged outside the detection region is arranged on the outside of the housing in the resting position. In other words, the cross-section-reduced part does not contribute to the formation of the bumper. The robot arm can be moved via the tilting joint between the resting position and the operating position, preferably an upper operating position. In this case, the tilting joint serves to transfer the robot arm, preferably the base segment, from an essentially horizontal orientation in the resting position to an essentially vertical orientation in the upper operating position. The tilting joint is preferably arranged between the upper side of the housing and the bottom side of the housing, preferably stowed in the housing. This ensures that the cross-section-reduced and thus more sensitive part of the robot arm is received in the housing in a protected manner in the resting position.

In a further specific embodiment, it is provided that at least the part of the robot arm that can be arranged outside the detection region largely covers the housing front in the resting position. In particular, in the resting position, the robot arm covers the housing front in the housing vertical direction by more than 50%, preferably by more than 70%, in particular by more than 85%. In other words, the segments of the robot arm that are arranged on the outside on the housing front are configured in such a manner that they largely or completely cover the height of the housing. A robot arm is thus proposed, which, in the resting position, provides a large contact surface for forming the bumper, in order to be able to map the necessary height of the cleaning robot.

In a further realization, it is provided that, in the resting position, the robot arm is arranged close to the contour, forming an air gap on the housing front, in particular the receiving region. The air gap serves in particular to enable a movement of the robot arm during the collision. In this case, "close to the contour" is to be understood to mean that the robot arm follows the outer contour of the housing with a small and/or constant distance. The air gap is preferably formed in the axial direction in relation to the housing longitudinal axis and/or the housing transverse axis between the robot arm and the housing, in particular the front surface or the side surfaces. In particular, the robot arm is arranged over the air gap at least in the longitudinal direction of the housing and/or in the transverse direction of the housing and/or in a contact-free manner with respect to the housing. For example, the air gap can have a gap width of less than 10 mm, preferably less than 5 mm, in particular less than 3 mm. The air gap ensures a relative movement between the robot arm and the housing, so that the collision in the joints of the robot arm can be registered by the contact sensor system. The air gap also renders it possible for only the robot arm to be exposed to the collision, while the housing experiences little or no vibration.

A further subject matter of the invention relates to a method for controlling the cleaning robot, as has already been described above. The method is particularly suitable for being implemented by means of a cleaning robot described herein. The control unit of the cleaning robot is preferably configured so as to implement the described method in whole or in part. For this purpose, the control unit can comprise a programmable microcomputer or microcontroller and the method can be in the form of a computer program product having program code means. The computer program product can also be stored on a computer-readable data carrier. Features or advantages of the method can be transferred to the control unit or the cleaning robot and vice versa.

In the method, the robot arm is transferred to an operating position in order to move an object and/or to clean a surface, and is transferred to a resting position in order to stow the robot arm on the housing, wherein, in the resting position, the robot arm is arranged on the housing front in order to form a bumper. In particular, the robot arm can assume a lower and/or an upper operating position. In the lower operating position, the robot arm is moved within the housing height and, in the upper operating position, is moved outside the housing height or above the housing.

In order to transfer the robot arm from the resting position to the upper operating position, the robot arm is first moved away from the robot front. For this purpose, the robot arm can first be transferred into the lower operating position. For example, for transfer into the lower operating position, the robot arm can be brought with all segments into a straight or rectilinear position in the same direction as the tilting axis and/or the longitudinal axis of the housing. In the lower operating position, the robot arm can be used, for example, to grip and/or move objects that are located in the travel path. The advantage of the lower operating position is that the cleaning robot can use the robot arm without influencing the overall robot height and thus also under furniture in order, for example, to bring objects out from under a cabinet or bed or to push movable obstacles to the side with a kind of "wiping movement".

The robot arm can then be transferred from the lower operating position to the upper operating position. For example, for transfer into the upper operating position, the robot arm can be tilted about the tilting axis. As soon as the robot arm is in the upper operating position, the robot arm can be rotated freely, in particular about the axis of rotation. In simple terms, the lower operating position renders it possible for the robot arm to be used within the height of the housing, and, in the upper operating position, renders it possible for the robot arm to be used at any height that can be reached. The return of the robot arm from the upper operating position into the resting position takes place in the reverse order. Due to the interim transfer of the robot arm into the lower operating position, the robot arm can be carried out into the upper operating position or the resting position without the risk of a collision of the robot arm with the housing or with the floor surface.

In a further realization, it is provided that in the resting position, contact with an obstacle is detected by the robot arm and a sensor signal is output, wherein, based on the sensor signal, a route plan of the cleaning robot is influenced, in particular so as to circumvent the obstacle. In particular, the sensor signal is transmitted to the control unit, in particular to the calculation module, and is taken into account by the calculation module in the route planning. The location and/or the size of the collision on the robot arm can preferably be determined on the basis of the sensor signal.

Other features which are considered as characteristic for the invention are set forth in the appended claims.

Although the invention is illustrated and described herein as embodied in a cleaning robot having a robot arm and also a method for controlling the cleaning robot, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
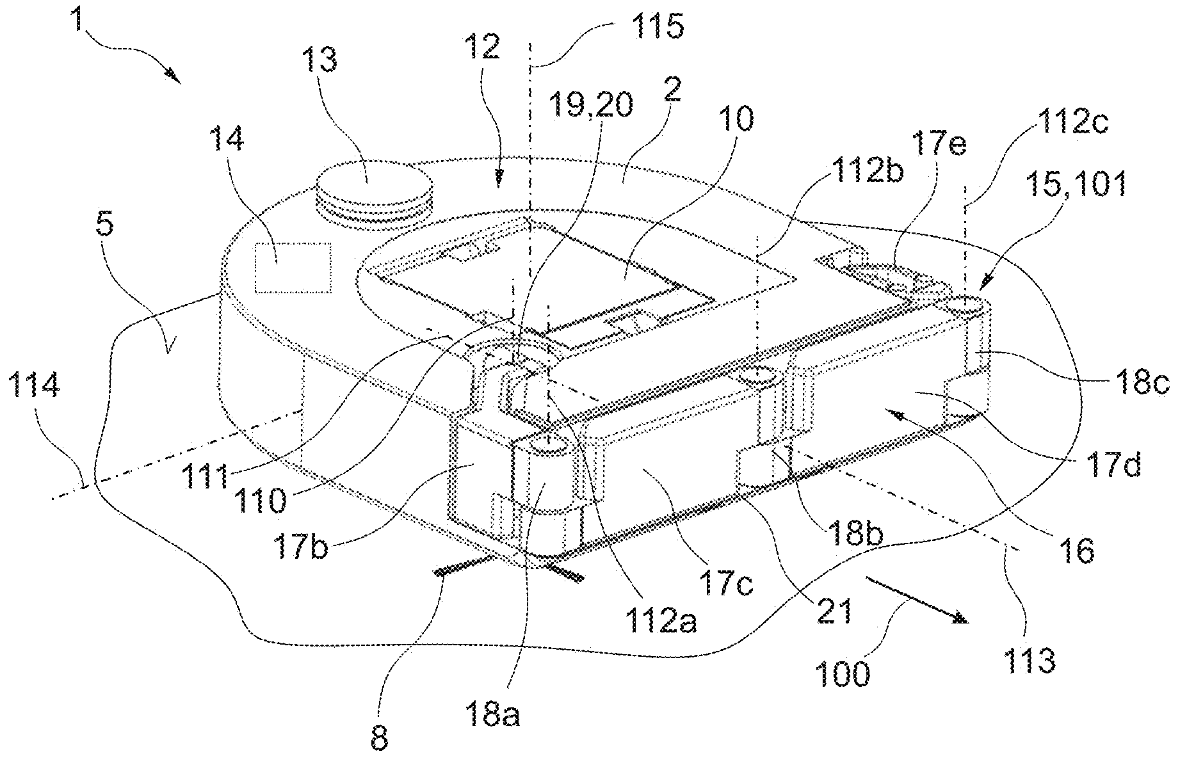
FIG. 1 is a diagrammatic, perspective plan view of a cleaning robot having a robot arm in a resting position as an exemplary embodiment of the invention.
Figure 2:
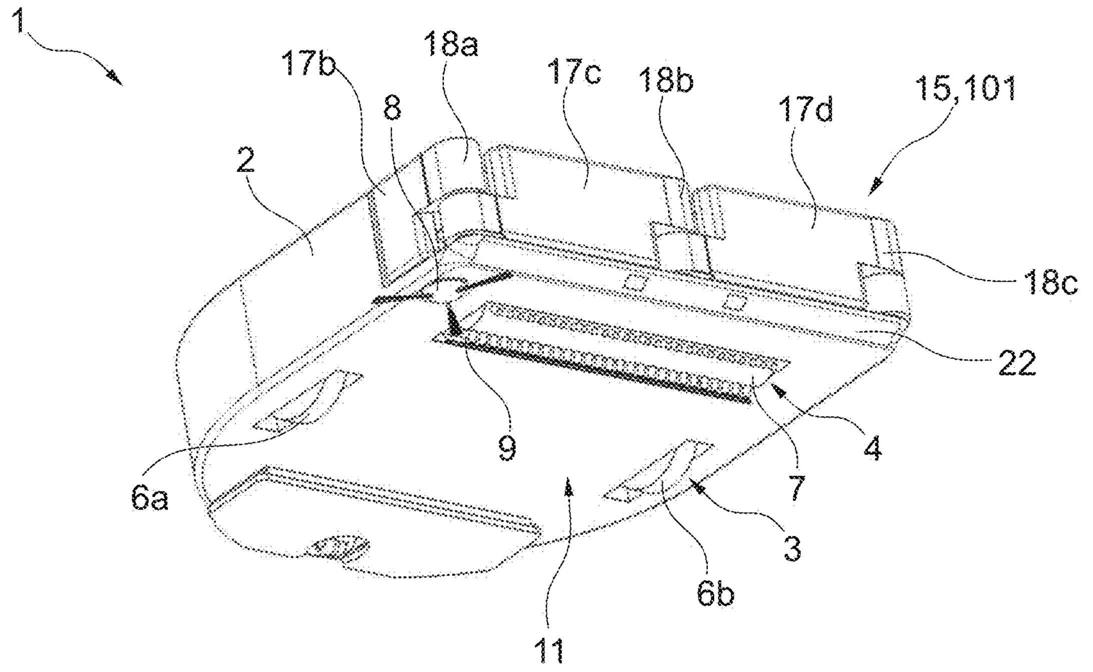
FIG. 2 is a perspective bottom view of the cleaning robot from FIG. 1.

Referring now to the figures of the drawings in detail and first, particularly to FIGS. 1 and 2 thereof, there is shown a cleaning robot 1 in different perspective views. The cleaning robot 1 is configured as an autonomously moving vacuuming robot, which is configured so as to implement vacuuming and sweeping operations in a cleaning area. The cleaning robot 1 can be between approximately 7 cm and 15 cm high, for example.

The cleaning robot 1 has a housing 2, in which a drive unit 3 is received (not illustrated in more detail) for driving the cleaning robot 1 and a floor cleaning unit 4 (not illustrated in more detail) for cleaning a floor surface 5 of the cleaning region.

As illustrated in FIG. 2, the drive unit 3 has two drive means 6*a*, 6*b* that are configured as drive wheels, which can be driven via a drive motor (not illustrated). By adjusting different speeds of the drive means 6*a*, 6*b*, the cleaning robot 1 can also perform rotations and cornering.

As illustrated in FIGS. 1 and 2, the floor cleaning unit 4 essentially has a brush roller 7, a side brush 8, a suction mouth 9, a collection container 10 and a suction fan (not illustrated). In this case, the brush roller 7, the side brush 8 and the suction mouth 9 are arranged on an underside 11, as illustrated in FIG. 2, of the housing 2, wherein the bristles of the brush roller 7 and of the side brush 8 act on the floor surface 5 to be cleaned in order to remove dust and dirt and transport them in the direction of the suction mouth 9. The suction mouth 9 is fluidically connected to the suction fan, which sucks in dust and dirt via the suction mouth 9 and conveys them into the collection container 10. In this case, the collection container 10 is removably arranged on an upper side 12 of the housing 2, as illustrated in FIG. 1. For example, the drive unit 3 and the floor cleaning unit 4 can be supplied with electrical energy via an energy storage unit (not illustrated), such as, for example, a rechargeable battery.

The cleaning robot 1 also has an environment sensor 13, which is configured so as to capture environmental data. The environment sensor 13 is configured so as to scan an environment of the cleaning robot 1 for detection and make it available as environment data to a schematically indicated control unit 14 that is arranged within the housing 2. For example, the environment data can be used for creating an environment map and/or for navigation. For example, the control unit 14 determines a movement path of the cleaning robot 1 over the floor surface 5 on the basis of the environmental data and navigates the cleaning robot 1 in accordance with the planned movement. In this case, the cleaning robot 1 travels over the floor surface 5 in a direction of travel 100 and cleans it. For example, the environment sensor 13 is configured as a lidar sensor.

The cleaning robot 1 also has a multi-articulated robot arm 15, which is arranged on a housing front 16 of the housing 2 in a resting position 101, as illustrated in FIGS. 1 and 2. The robot arm 15 can be controlled by the control unit 14 and supplied with electrical energy by the energy store. The cleaning robot 1 can use the robot arm 15 to clean on raised surfaces, grip and insert tools, or pick up and/or move objects.

The robot arm 15 has a plurality of segments 17*a*, 17*b*, 17*c*, 17*d*, 17*e*, which are connected to one another in an articulated manner via a joint 18*a*, 18*b*, 18*c*, 19, 20 in each case to form a serial kinematic system. A first segment 17*a* is configured as a base segment, which can be rotated about an axis of rotation 110 relative to the housing 2 via a base joint 19. A second, third and fourth segment 17*b*, 17*c*, 17*d* are each configured as an intermediate segment, wherein the second segment 17*b* is connected to the first segment 17*a* in such a manner that it can be tilted about a tilting axis 111 via a tilting joint 20, the second segment 17*b* is connected to the third segment 17*c* in such a manner that it can be pivoted about a first pivoting axis 112*a* via a first joint 18*a*, and the third segment 17*d* is connected to the fourth segment 17*d* in such a manner that it can be pivoted about a second pivoting axis 112*b* via a second joint 18*b*. Conversely, a fifth segment 17*e* is configured as an end effector, which serves for gripping objects and/or tools. The fifth segment 17*e* is in turn connected to the fourth segment 17*d* so as to be pivotable about a third pivot axis 112*c* via a third joint 18*c*. The first, second and third joints 18*a*, 18*b*, 18*c* are in the form of a pivoting joint. The joints 18*a*, 18*b*, 18*c*, the base joint 19 and the tilting joint 20 are each equipped with an electric joint drive.

The housing 2 has a receiving region 21 on the housing front 16, in which the robot arm 15 is stowed in the resting position 101. In the resting position 101, the robot arm 15 forms a bumper in order to absorb and/or detect a collision with an obstacle. For this purpose, in the resting position 101, the robot arm 15 is arranged axially in the receiving region 21 with a slight protrusion of, for example, 1 mm to 2 mm in relation to a housing longitudinal axis 113, a housing transverse axis 114 and a housing vertical axis 115. The robot arm 15 thus protrudes slightly beyond the housing 2 forwards, to the two sides and upwards, as a result of which the robot arm 15 first comes into contact with an obstacle, even before the housing 2 itself would collide with the obstacle. The housing longitudinal axis 113 and the housing transverse axis 114 are to be understood as two axes of the housing 2 that are arranged at right angles to one another, which are oriented in the same direction and/or parallel to the floor surface 5, wherein the direction of travel 100 is oriented axially with respect to the housing longitudinal axis 113. In this case, the housing vertical axis 115 is oriented perpendicularly to the housing longitudinal axis 113 and the housing transverse axis 114 and/or to the floor surface 5.

Figure 5:
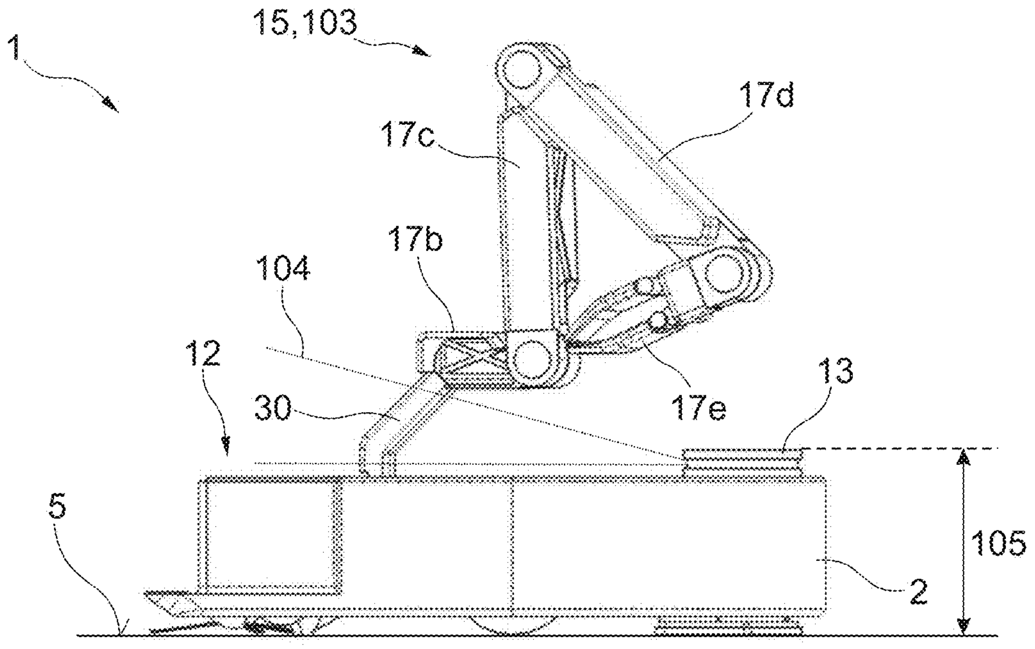
FIG. 5 is a side view of the cleaning robot with the robot arm in an upper operating position.

In addition, in the resting position 101, the robot arm 15 is arranged within a maximum height 105, as can be seen in FIG. 5, of the cleaning robot 1 in relation to the housing vertical axis 115. In the resting position 101, the robot arm 15 is thus arranged without protrusion to the highest point, in this case the environment sensor 13, of the cleaning robot 1, as a result of which the robot arm 15 does not form an interference contour when driving under objects, such as, for example, furniture.

Figure 3:
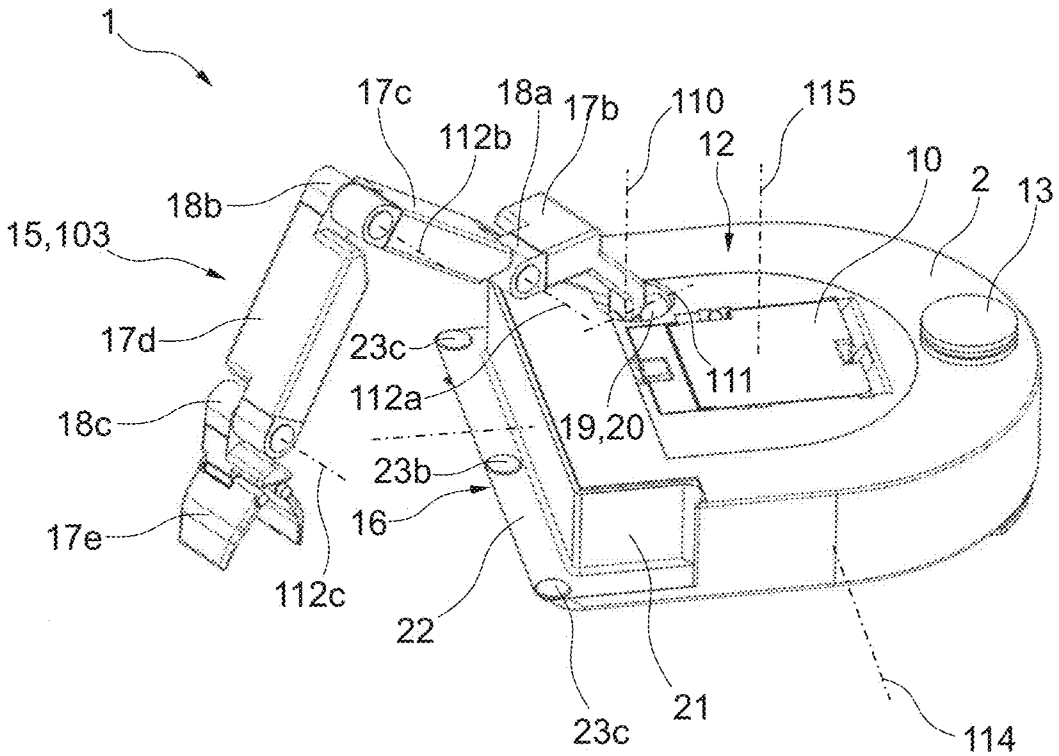
FIG. 3 is a perspective illustration of the cleaning robot with the robot arm in an upper operating position.

As illustrated in FIG. 3, the receiving region 21 has a bearing section 22, which is used for horizontally bearing the robot arm 15 in the resting position 101. For this purpose, the bearing section 22 extends in the axial direction with respect to the housing longitudinal axis 113 and the housing transverse axis 114, as also illustrated in FIG. 2, circumferentially on the housing front 16. In the resting position 101, the robot arm 15 thus rests on the bearing section 22, at least in sections in the axial direction with respect to the housing vertical axis 115, in order to relieve the joints 18*a*, 18*b*, 18*c*, 20 of the robot arm 15 and the joint drives, not illustrated, located therein.

The bearing section 22 has a sliding surface 23*a*, 23*b*, 23*c* for each joint 18*a*, 18*b*, 18*c*, via which the robot arm 15 is supported in a sliding manner in the resting position 101 with the respective joint 18*a*, 18*b*, 18*c*. For example, the sliding surfaces 23*a*, 23*b*, 23*c* are each formed by a Teflon platelet, which is arranged on the bearing section 22. Due to the sliding bearing arrangement, a relative movement in the event of a collision of the robot arm 15 with an obstacle is already ensured in the event of a small introduction of force, due to the reduced frictional force, as a result of which it is possible to particularly reliably detect a collision by the robot arm 15.

Figure 4:
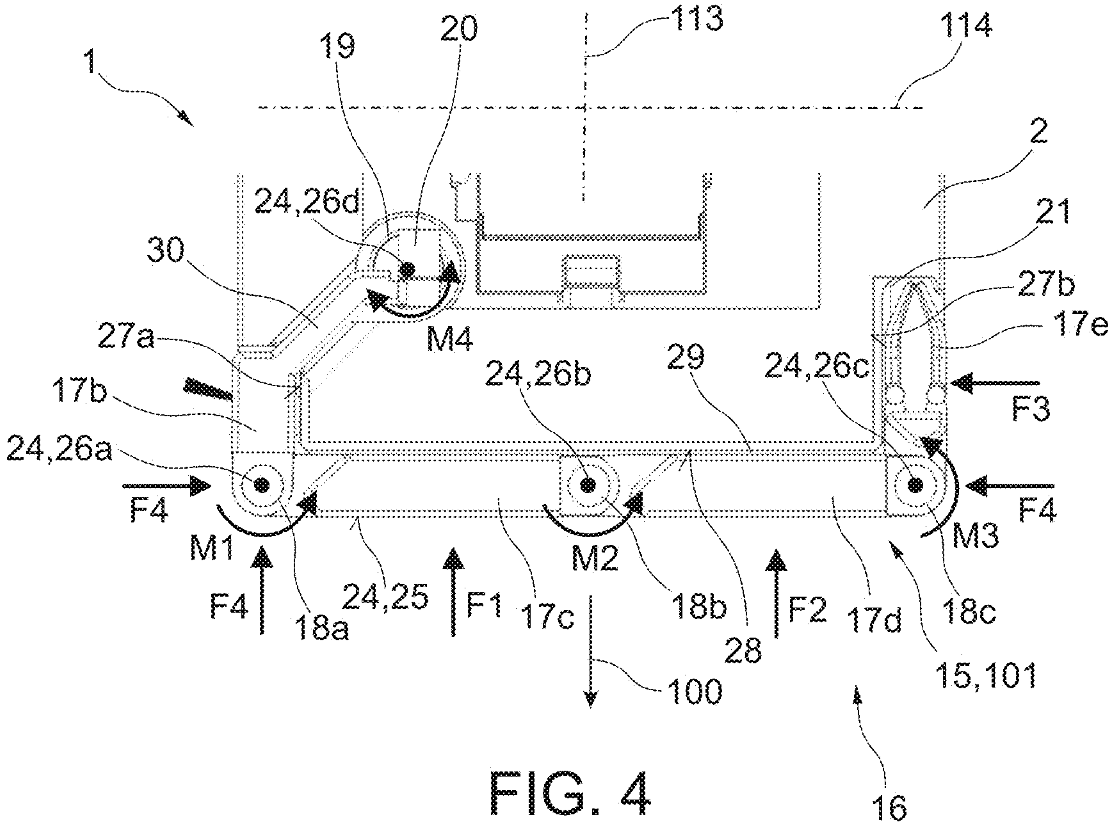
FIG. 4 is a detailed plan view of the robot arm of the cleaning robot of FIG. 1.

For this purpose, the robot arm 15 has a contact sensor system 24, which, as described in FIG. 4, in the resting position 101 is used so as to detect a collision of the robot arm 15 with an obstacle. In principle, the contact sensor system 24 can be formed by a surface sensor 25, which is arranged in a planar manner at least on the front outer side of the segments 17*a*, 17*b*, 17*c*, 17*d*, 17*e* and reacts to resistive or capacitive changes. Alternatively, or optionally in addition, however, the motor currents of the joint drives could also be monitored by the control unit 14.

Alternatively or optionally in addition, the contact sensor system 24 has a plurality of contact sensors 26*a*, 26*b*, 26*c*, 26*d*, which are configured as torque sensors and are arranged in the joints 18*a*, 18*b*, 18*c* and the base joint 19, in order to detect a torque M1, M2, M3, M4 about the respective pivot axis 112*a*, 112*b*, 112*c* or the axis of rotation 110 when a force F1, F2, F3, F4 is introduced. Alternatively, or optionally in addition, contact sensors, not illustrated, that are configured as force sensors can be used in the segments 17*a*, 17*b*, 17*c*, 17*d*, 17*e* in order to directly detect the introduced forces F1, F2, F3, F4.

The contact sensor system 24 is configured so as to provide a sensor signal based on the resistive or capacitive changes and/or a current change of the motor currents and/or the torques M1, M2, M3, M4 and/or the forces F1, F2, F3, F4, which is evaluated by the control unit 14 and taken into account in the route planning.

Depending on the contact point of a contact or collision, as explained in FIG. 4 by way of example with reference to the illustrated forces F1, F2, F3, F4, corresponding torques M1, M2, M3, M4 are introduced at the different joints 18*a*, 18*b*, 18*c*, 19, which torques indicate the size and the location of the collision. This is achieved in that, in the rest position 101, the axis of rotation 110 and the pivot axes 112*a*, 112*b*, 112*c* are oriented in the same direction as one another or with respect to the housing vertical axis 115. For example, force introduction at the third segment 17*c* by the force F1 results in a torque M1 about the first pivot axis 112*a*, which is detected by a first contact sensor 26*a* in the first joint 18*a*. For example, a force introduction on the fourth segment 17*d* by the force F2 results in a torque M2 about the second pivot axis 112*b*, which is detected by a second contact sensor 26*b* in the second joint 18*b*. For example, a force introduction at the fifth segment 17*e* by the force F3 results in a torque M3 about the third pivot axis 112*c*, which is detected by a third contact sensor 26*c* in the third joint 18*c*. For example, force introduction at the second segment 17*b* and/or at the first joint 18*a* and/or at the third joint 18*c* by one of the forces F4 results in a torque M4 about the axis of rotation 110, which is detected by a fourth contact sensor 26*d* in the base joint 19.

Thus, the base joint 19 and the joints 18*a*, 18*b*, 18*c* are arranged in such a manner that collisions from any directions with respect to the housing longitudinal axis 113 and the housing transverse axis 114 can be registered, since there is at least one corresponding joint for each direction of force to be detected. It should be noted that a force can also be distributed to a plurality of joints 18*a*, 18*b*, 18*c*, 19. For example, the force F2 is distributed to the base joint 19 and the first and second joints 18*a*, 18*b*.

In the plan view, the housing front 16 has a rectangular outer contour, wherein in the resting position the second segment 17*b* is arranged on a first side surface 27*a* of the housing 2. The third and fourth segments 17*c*, 17*d* are arranged on a front surface 28 of the housing 2, and the fifth segment 17*e* is arranged on a second side surface 27*b* of the housing 2 spaced from the housing 2 via an air gap 29, in order to enable a relative movement of the robot arm 15 with respect to the housing 2 both in the direction of travel 100 as well as on the sides, so that a collision of the robot arm 15 with an obstacle can be detected. In this case, the first and the second side surfaces 27*a*, 27*b* each extend in a radial plane of the housing transverse axis 114 and the front surface 28 in a radial plane of the housing longitudinal axis 113. The air gap 29 also renders it possible for only the “soft” robot arm 15 to be exposed to the collision, while the housing 2, in particular the housing front 16, experiences little or no vibration.

As is apparent in FIG. 4, the second segment 17*b* is connected to the tilting joint 20 with a lever arm 30, which deviates from the segment line at an angle of less than 90 degrees, for example about 45 degrees. Furthermore, in the resting position, the joints 18*a*, 18*b*, 18*c* lie in the segment line of at least one associated segment. This results in a particularly advantageous arrangement of the joints 18*a*, 18*b*, 18*c*, 18*d*, 19 with respect to the segments 17*b*, 17*c*, 17*d*, 17*e*, so that the contact sensors 26*a, b, c* can register collisions at all points of the segments 17*b*, 17*c*, 17*d*, 17*e*.

In FIG. 5, the robot arm 15 is arranged in an operating position, hereinafter referred to as the upper operating position 103. In the upper operating position 103, the robot arm 15 protrudes beyond the upper side 12 of the housing 2 or the maximum height 105 that is defined by the environment sensor 13, in order to be able to operate any height that can be reached. In this case, a part of the robot arm 15, preferably the lever arm 30, that is arranged within a detection region 104 of the environment sensor 13 has a smaller cross section than a part of the robot arm 15 that is arranged outside the detection region. For example, the lever arm 30 of the second segment 17*b* has a smaller width than the remaining part of the second segment 17*b*. The lever arm 30 is configured as thin as possible in order to impede the detection region 104 of the environment sensor 13 as little as possible, i.e. to absorb as few of the measuring beams as possible and thus to generate a dead region for the environment sensor, for example the lidar sensor, with regard to an environment detection.

Figure 6:
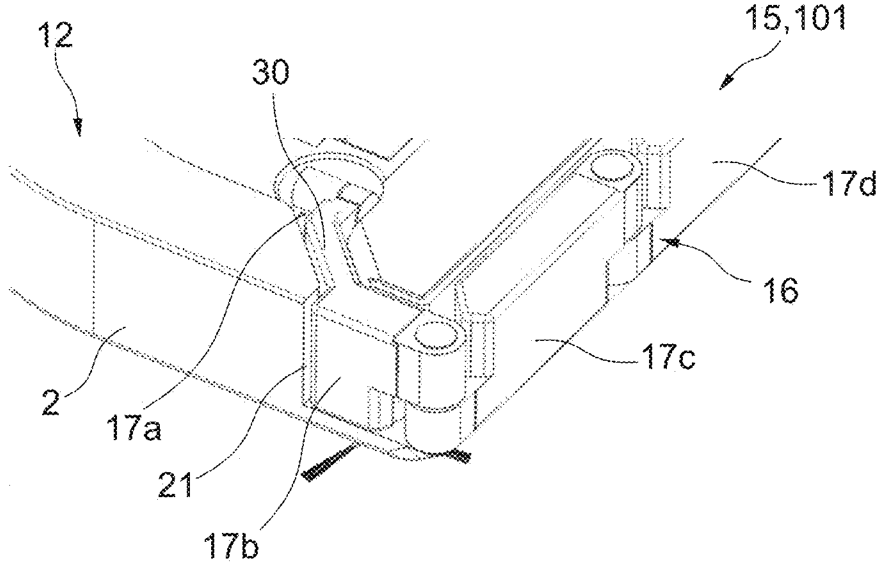
FIG. 6 is a perspective detailed view of the robot arm of the cleaning robot from FIG. 1.

Conversely, in the resting position 101 the lever arm 30 is received in a recessed manner in the housing 2, as illustrated in FIG. 6, while the part of the robot arm 15 that can be arranged outside the detection region 104 in the resting position 101 is arranged on the housing 2 on the outside on the housing front 16. In this case, the part of the robot arm 15 that can be arranged outside the detection region 104, that is to say in particular the part of the second segment 17*b* that can be arranged outside the detection region 104, and the remaining segments 17*c*, 17*d*, 17*e*, are deliberately configured to be wide in order to largely cover the height of the housing 2 and thus form a wide contact surface for the bumper. The segments 17*a*, 17*b*, 17*c*, 17*d*, 17*e* can be hollow or have a support structure provided with cover surfaces in order to reduce the mass of the segments 17*a*, 17*b*, 17*c*, 17*d*, 17*e* or of the robot arm 15.

Figure 7:
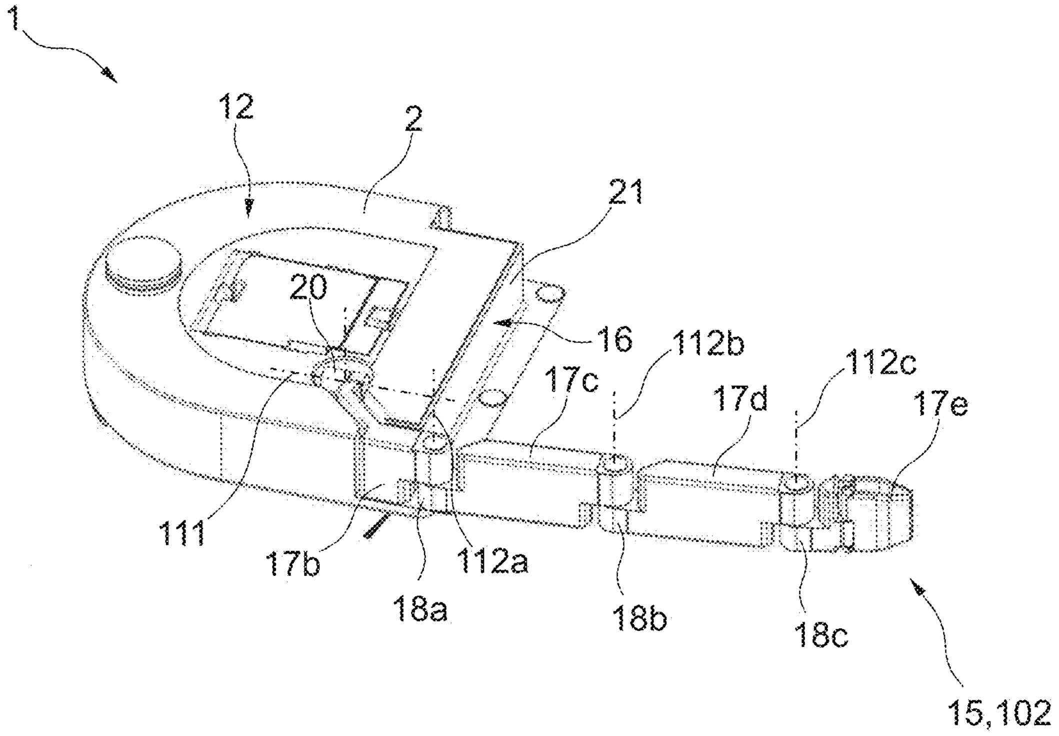
FIG. 7 is a perspective illustration of the cleaning robot with the robot arm in a lower operating position.
Figure 8:
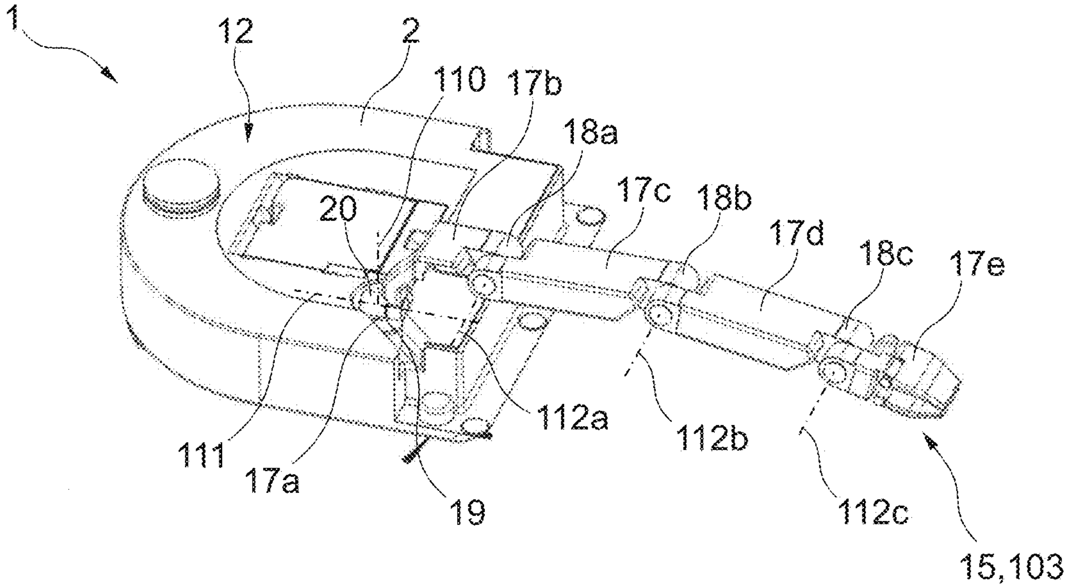
FIG. 8 is a perspective illustration of the cleaning robot with the robot arm in an upper operating position.

A method for controlling the robot arm 15 is described below with reference to FIGS. 7 and 8. In order to transfer the folded robot arm 15 from the resting position 101, as illustrated, for example, in FIG. 1, to the upper operating position 103, as illustrated, for example, in FIG. 3, the robot arm 15 is first transferred to a lower operating position 102, as illustrated in FIG. 7. For this purpose, the third, fourth and fifth segments 17*c*, 17*d*, 17*e* are first moved away from the housing front 16 from the receiving region 21 via the joint drives of the joints 18*a*, 18*b*, 18*c*. For this purpose, the segments 17*c*, 17*d*, 17*e* are preferably oriented into an essentially rectilinear position and/or essentially in the same direction as the tilting axis 111 of the tilting joint 20. Alternatively, the segments 17*c*, 17*d*, 17*e* are oriented in such a manner that they do not collide with the floor surface 5 or the housing 2 during the tilting movement.

The robot arm 15 can be transferred from the lower operating position 102 to the upper operating position 103, as illustrated in FIG. 7, by means of a tilting movement without the risk of a collision of the robot arm 15 with the housing 2 or with the floor. For this purpose, the second segment 17*b* is first tilted from the receiving region 21 via the joint drive of the tilting joint 20 to the housing upper side 12. Once the robot arm 15 is in the upper operating position 103, all joints 18*a*, 18*b*, 18*c*, 19, 20 can be used without restriction. The return of the robot arm 15 from the upper operating position 103 into the resting position 101 takes place in the reverse order. Depending on the joint position, the segments 17*c*, 17*d*, 17*e* can be arranged at least in sections in the detection region 104 of the environment sensor 13, wherein the control unit 14 is configured so as to take this into account when processing the environment data.

Optionally, the robot arm 15, in particular the joints 18*a*, 18*b*, 18*c*, can also be used in the lower operating position 102. The advantage of the lower operating position 102 is that the cleaning robot 1 can use the robot arm 15 without influencing the overall robot height and thus also under furniture in order, for example, to bring objects out from under a cabinet or bed or to push objects to the side with a kind of “wiping movement”.

The following is a summary list of reference numerals and the corresponding structure used in the above description of the invention:

1 Cleaning robot
2 Housing
3 Drive unit

4 Floor cleaning unit
5 Floor surface
6*a, b* Drive means
7 Brush roller
8 Side brush
9 Suction mouth
10 Collection container
11 Underside
12 Upper side
13 Environment sensor
14 Control unit
15 Robot arm
16 Housing front
17*a-e* Segments
18*a-c* Joints
19 Base joint
20 Tilting joint
21 Receiving region
22 Bearing section
23*a-c* Sliding surface
24 Contact sensor system
25 Surface sensor
26*a-d* Contact sensor
27*a, b* Side surface
28 Front surface
29 Air gap
30 Lever arm
100 Direction of travel
101 Resting position
102 Lower operating position
103 Upper operating position
104 Detection region
105 Maximum height
110 Rotation axis
111 Tilting axis
112*a-c* Pivoting axis
113 Housing longitudinal axis
114 Housing transverse axis
115 Housing vertical axis

The invention claimed is:

1. A cleaning robot for cleaning a cleaning region, the cleaning robot comprising:

a housing having a housing front;

a drive unit for driving the cleaning robot in the cleaning region;

a floor cleaning unit for cleaning a floor surface of the cleaning region;

a robot arm for moving objects and/or for cleaning a surface that is raised with respect to the floor surface, wherein said robot arm is disposed in a resting position on said housing front of said housing, said robot arm forming a bumper in the resting position, wherein said robot arm has at least two segments connected to one another via a joint to form a serial kinematic system and further has at least one articulated drive; and a controller for controlling said drive unit, said floor cleaning unit and said robot arm, wherein said controller is configured to monitor a motor current of said at least one articulated drive to detect a collision of said robot arm with an obstacle in the resting position and, in response to the detected collision, to influence a route plan of the cleaning robot.

2. The cleaning robot according to claim 1, wherein:

said housing has a receiving region for said robot arm on said housing front; and in the resting position, said robot arm is disposed within a maximum height of the cleaning robot in said receiving region and is disposed with a protrusion in said receiving region at least in relation to a housing vertical axis and/or a housing longitudinal axis.

3. The cleaning robot according to claim 2, wherein:

said receiving region has a bearing section for bearing said robot arm on said housing; and said bearing section has at least one sliding surface, via which said robot arm is supported in the resting position, at least in sections, in a sliding manner on said bearing section.

4. The cleaning robot according to claim 1, wherein said robot arm having joints which are all disposed in the resting position such that, when said robot arm comes into contact with the obstacle, for each direction of force an associated torque results about at least one of said joints, said associated torque being detectable by monitoring of the motor current.

5. The cleaning robot according to claim 1, further comprising an environment sensor for detecting environment data in relation to the cleaning region, wherein, in an operating position, said robot arm is disposed at least in sections in a detection region of said environment sensor, wherein a part of said robot arm that is disposed in the detection region has a smaller cross section than a part of said robot arm that is disposed outside the detection region.

6. The cleaning robot according to claim 5, wherein at least said part of said robot arm which is disposed in the detection region is countersunk in the resting position in said housing, and/or at least said part of said robot arm which is disposed outside the detection region is disposed on an outside on said housing in the resting position.

7. The cleaning robot according to claim 6, wherein in the resting position, said part of said robot arm that is disposed outside the detection region largely covers said housing front.

8. The cleaning robot according to claim 1, wherein in the resting position, said robot arm is disposed close to a contour, forming an air gap on said housing front.

9. A method for controlling a cleaning robot, which comprises the steps of:

transferring a robot arm into at least one operating position in order to move an object and/or to clean a surface;

transferring the robot arm to a resting position in order to stow the robot arm, wherein, in the resting position, the robot arm is disposed on a housing front and forms a bumper;

monitoring a motor current of at least one articulated drive of the robot arm to detect contact with an obstacle when the robot arm is in the resting position and outputting a sensor signal; and influencing a route plan of the cleaning robot based on the sensor signal.

* * * * *